(12) United States Patent
Chand et al.

(10) Patent No.: US 11,789,534 B2
(45) Date of Patent: *Oct. 17, 2023

(54) GENERATING A RESPONSE THAT DEPICTS HAPTIC CHARACTERISTICS

(71) Applicant: Snap Inc., Santa Monica, CA (US)

(72) Inventors: Jesse Chand, Los Angeles, CA (US); Krish Jayaram, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/248,483

(22) Filed: Jan. 27, 2021

(65) Prior Publication Data

US 2021/0149494 A1 May 20, 2021

Related U.S. Application Data

(63) Continuation of application No. 15/431,325, filed on Feb. 13, 2017, now Pat. No. 10,936,067.

(51) Int. Cl.
*G06F 3/01* (2006.01)
*G06F 3/041* (2006.01)
*G06F 3/042* (2006.01)

(52) U.S. Cl.
CPC .............. *G06F 3/016* (2013.01); *G06F 3/041* (2013.01); *G06F 3/0414* (2013.01); *G06F 3/017* (2013.01); *G06F 3/0412* (2013.01); *G06F 3/0425* (2013.01)

(58) Field of Classification Search
CPC ........ G06F 3/016; G06F 3/017; G06F 3/0414; G06F 3/0412; G06F 3/041; G06F 3/0425
See application file for complete search history.

(56) References Cited

U.S. PATENT DOCUMENTS

| | | |
|---|---|---|
| 6,038,295 A | 3/2000 | Mattes |
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |

(Continued)

FOREIGN PATENT DOCUMENTS

CA 2887596 A1 7/2015

OTHER PUBLICATIONS

"U.S. Appl. No. 15/431,325, Examiner Interview Summary dated Oct. 13, 2020", 3 pgs.

(Continued)

*Primary Examiner* — William Boddie
*Assistant Examiner* — Saifeldin E Elnafia
(74) *Attorney, Agent, or Firm* — Schwegman Lundberg & Woessner, P.A.

(57) ABSTRACT

In various example embodiments, a system and method for generating a response that depicts haptic characteristics are presented. Haptic data is received from a client device and the haptic data indicates an interaction with a sensor included in the client device. Haptic characteristics are determined based on the haptic data. At least one image that depicts the determined haptic characteristics is generated. And the at least one image is caused to be displayed on the client device.

20 Claims, 11 Drawing Sheets

(56) References Cited

U.S. PATENT DOCUMENTS

| | | | |
|---|---|---|---|
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,443,227 | B2 | 9/2016 | Evans et al. |
| 9,489,661 | B2 | 11/2016 | Evans et al. |
| 9,491,134 | B2 | 11/2016 | Rosen et al. |
| 2006/0132457 | A1* | 6/2006 | Rimas-Ribikauskas ............... G06F 3/04812 345/173 |
| 2011/0202598 | A1 | 8/2011 | Evans et al. |
| 2012/0209924 | A1 | 8/2012 | Evans et al. |
| 2012/0249474 | A1* | 10/2012 | Pratt ............... G06F 1/1694 345/174 |
| 2014/0340318 | A1 | 11/2014 | Stringer |
| 2015/0042573 | A1 | 2/2015 | Grant et al. |
| 2016/0018891 | A1* | 1/2016 | Levesque ............ H05K 999/99 345/174 |
| 2016/0162024 | A1* | 6/2016 | Bombacino ......... G06F 16/5866 345/156 |
| 2016/0306502 | A1* | 10/2016 | Ramadge ............. G06F 3/0481 |

OTHER PUBLICATIONS

"U.S. Appl. No. 15/431,325, Final Office Action dated Jan. 10, 2020", 14 pgs.

"U.S. Appl. No. 15/431,325, Non Final Office Action dated Jun. 24, 2019", 11 pgs.

"U.S. Appl. No. 15/431,325, Non Final Office Action dated Jul. 13, 2020", 16 pgs.

"U.S. Appl. No. 15/431,325, Notice of Allowance dated Oct. 28, 2020", 11 pgs.

"U.S. Appl. No. 15/431,325, Response filed Apr. 6, 2020 to Final Office Action dated Jan. 10, 2020", 11 pgs.

"U.S. Appl. No. 15/431,325, Response filed Sep. 23, 2019 to Non Final Office Action dated Jun. 24, 2019", 10 pgs.

"U.S. Appl. No. 15/431,325, Response filed Oct. 12, 2020 to Non Final Office Action dated Jul. 13, 2020", 12 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

ГЕНЕРАТИNG A RESPONSE THAT DEPICTS
HAPTIC CHARACTERISTICS

CLAIM OF PRIORITY

This application is a continuation of U.S. patent application Ser. No. 15/431,325, filed on Feb. 13, 2017, which is incorporated herein by reference in its entirety.

TECHNICAL FIELD

Embodiments of the present disclosure generally relates to the technical field of special-purpose machines that enhance interaction with messaging systems including computerized variants of such special-purpose machines and improvements to such variants, and to the technologies by which such special-purpose machines become improved compared to other special-purpose machines that facilitate interactions with the messaged systems. Specifically, the present disclosure addresses systems and methods of determining and displaying a response based on haptic data or non-haptic data.

BACKGROUND

Conventionally, in various example embodiments, a user may interact with a touch screen of a computing device. Often times, the interaction with the touch screen is a form of user input that can be used to perform an action with respect to an application currently being executed by the computing device. For many users, the experience with the touch screen will finish once the action is performed since many conventional systems do not analyze or process the interaction with the touch screen in order to generate a response that the user can view.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
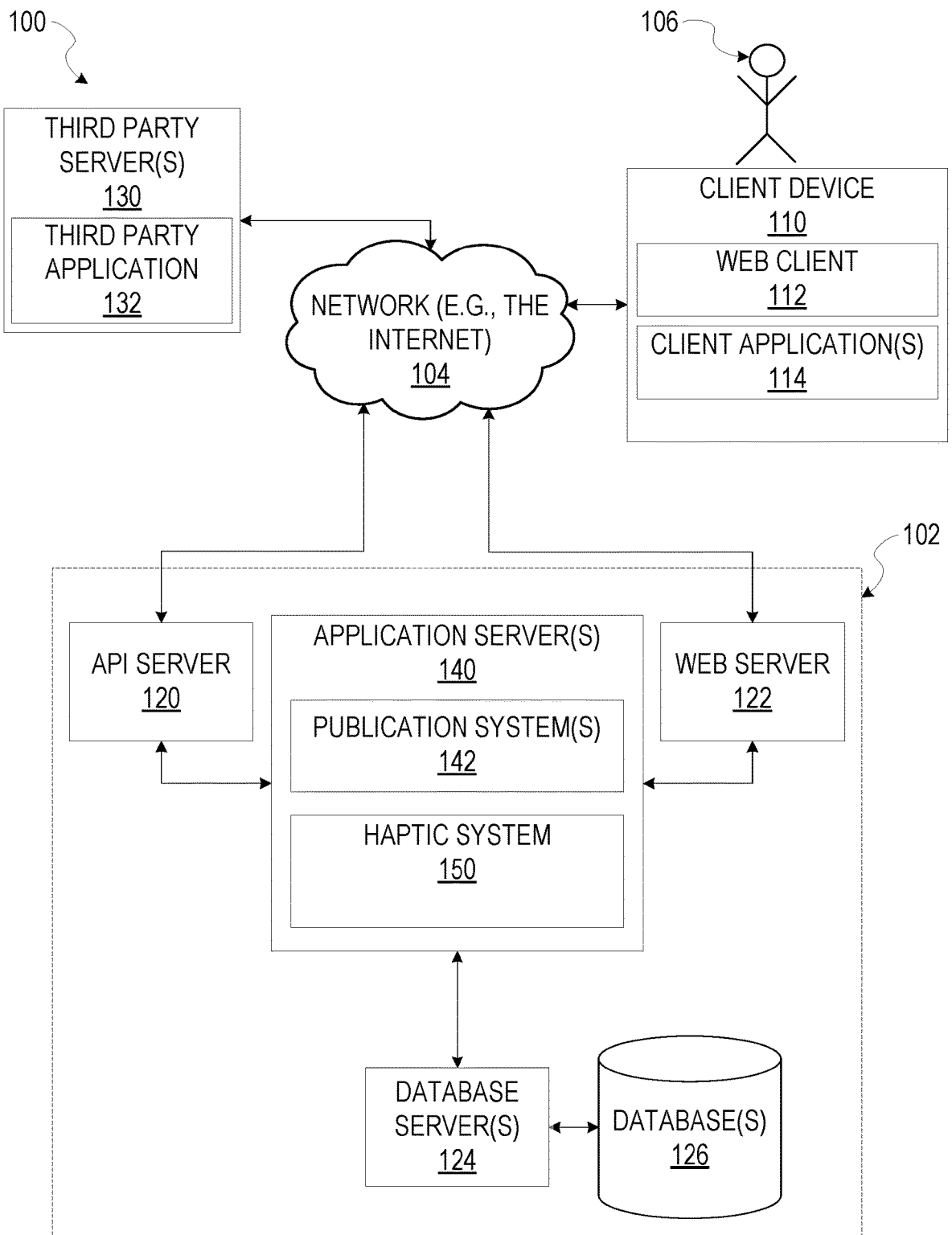
FIG. 1 is a block diagram illustrating a networked system, according to some example embodiments.

The description that follows describes systems, methods, techniques, instruction sequences, and computing machine program products that illustrate example embodiments of the present subject matter. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments, a user may interact with a touch screen of a client device. In some cases, the touch screen of the client device may currently display a user interface that depicts images or video to the user. As the user interacts with the touch screen of the client device, the touch screen detects the interaction and generates haptic data which is sent to a haptic system.

In various example embodiments, the haptic system determines haptic characteristics of the haptic data. As further explained below, the haptic characteristics may indicate characteristics of the user interaction, such as location, force, time, and motion, for example. In this determination, the haptic may system may compare the haptic characteristics with predetermined threshold characteristics. Once the determination is completed, the haptic system generates an image that depicts the haptic characteristics. In some cases, the image is a graph with features that correspond to the haptic characteristics. The image is then transmitted by the haptic system to the client device of the user and displayed in the user interface.

In various example embodiments, the haptic system will also generate a haptic response. The haptic response may be generated based on data that is received from the client device. For instance, the haptic response may be generated based on images or video received from the client device. The haptic response may also be generated based on messages received from the client device. Once the haptic response is generated, the haptic system may transmit data to the client device that causes execution of the haptic response on the client device.

In further example embodiments, the haptic system will generate, in response to receiving the haptic data, a response that includes modifying graphical elements that are previously displayed in a user interface of the client device. Modification of the graphical elements may include modification of an image that is previously displayed in the user interface of the client device.

Example methods (e.g., algorithms) facilitate generation of images that depict haptic characteristics, providing one or more users with the generated images, or both, and example systems (e.g., special-purpose machines) are configured to facilitate generation of images that depict haptic characteristics, providing one or more users with the generated images, or both. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

Accordingly, one or more of the methodologies discussed herein may obviate a need for a user to send multiple requests to a server for a response or feedback, which may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 is shown. A networked system 102, in the example forms of a network-based messaging system, provides server-side functionality via a network 104 (e.g., the Internet or wide area network (WAN)) to one or more client devices 110. FIG. 1 illustrates, for example, a web client 112 (e.g., a web browser, such as the Internet Explorer® browser developed by Microsoft® Corporation of Redmond, Wash. State), and a client application 114 executing on client device 110.

The client device 110 may comprise, but is not limited to, a mobile phone, desktop computer, laptop, portable digital assistants (PDAs), smart phones, tablets, laptops, multi-processor systems, microprocessor-based or programmable consumer electronics, or any other communication device that a user may utilize to access the networked system 102. In some embodiments, the client device 110 includes components that are used to display information (e.g., in the form of user interfaces). In further embodiments, the client device 110 may comprise one or more of touch screens, accelerometers, gyroscopes, cameras, microphones, global positioning system (GPS) devices, and so forth. In one embodiment, the networked system 102 is a network-based messaging system that handles requests that include data, generates messages or content based in part on the data included in the requests, and publishes the generated messages or content. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, and the like. In some embodiments, if the messaging application is included in a given one of the client device 110, then this application is configured to locally provide the user interface of the client device 110 and at least some of the functionalities with the application configured to communicate with the networked system 102, on an as needed basis, for data and/or processing capabilities not locally available.

A user 106 may be a person, a machine, or other means of interacting with the client device 110. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 host the publication system 142 and haptic system 150, each of which may comprise one or more modules, engines, or applications and each of which may be embodied as hardware, software, firmware, circuitry, or any combination thereof. The application servers 140 are, in turn, shown to be coupled to one or more database servers 124 that facilitate access to one or more information storage repositories or database(s) 126. In an example embodiment, the databases 126 are storage devices that store information communicated (e.g., publications or messages) to the publication system 142.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more messaging, publication, or haptic functions that are supported by the relevant applications of the networked system 102.

The publication systems 142 provide a number of publication functions and services to users 106 that access the networked system 102. For instance, the publication system 142 publishes or generates the messages that are based in part on user inputs received from a client device (e.g., client device 110). Further, the publication system 142 may transmit publications (e.g., published messages) to other client devices in communication with the networked system 102.

The haptic system 150 provides functionality that enables users to view generated images that depict certain haptic characteristics. For instance, the haptic system 150 receives user input from a client device, determines haptic characteristics of the user input, and generates an image that depicts the haptic characteristics. In generating the images, the haptic system 150 may access the databases 126, the third party servers 130, the publication system 142, and other sources. In some example embodiments, the haptic system 150 communicates with the publication systems 142 such that the haptic system 150 receives publications from the publication system 142 in order to send to one or more client devices (e.g., client device 110). In an alternative embodiment, the haptic system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

The web client 112 accesses the various publication and haptic systems 142 and 150 via the web interface supported by the web server 122. Similarly, the client application 114 accesses the various services and functions provided by the publication and haptic systems 142 and 150 via the programmatic interface provided by the API server 120. The client application 114 may, for example, be a messaging application that enables users to communicate with one another over the networked system 102 by transmitting data between the client devices (e.g., client device 110).

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine.

For example, a special-purpose computer system able to implement any one or more of the methodologies described herein is discussed below with respect to FIG. 3-6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

Figure 2:
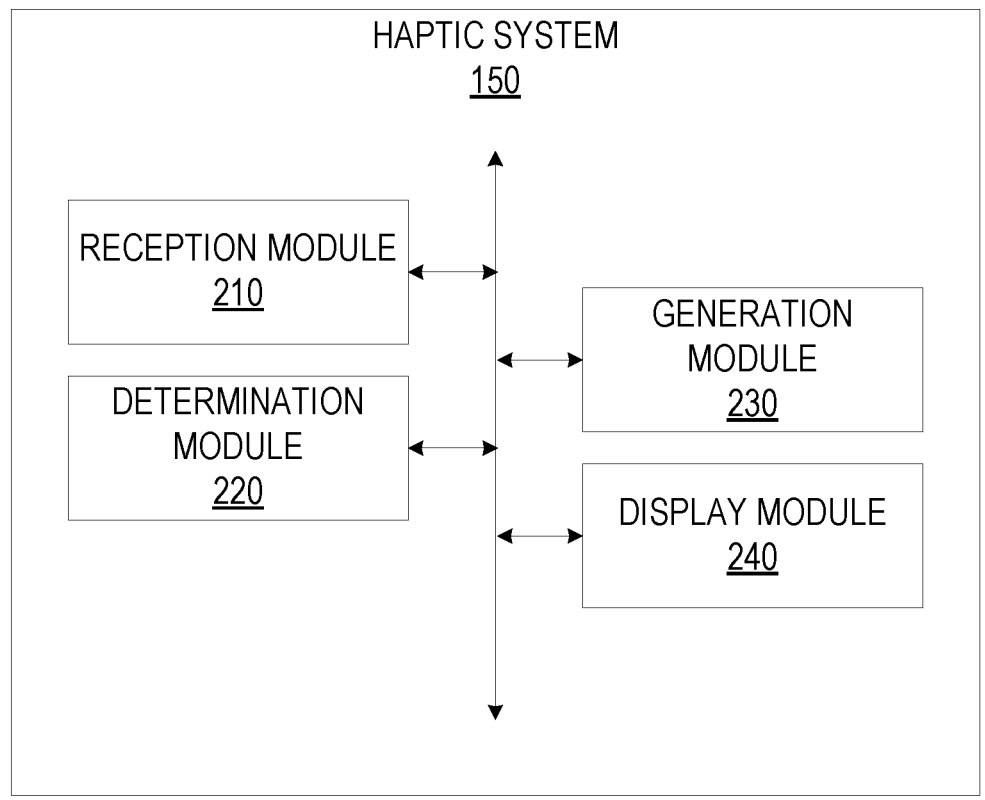
FIG. 2 is a block diagram illustrating components of a haptic system, according to some example embodiments.

FIG. 2 is a block diagram illustrating components of the haptic system 150, according to some example embodiments. The haptic system 150 is shown as including an reception module 210, a determination module 220, a generation module 230, and a display module 240, all configured to communicate with each other (e.g., via a bus, shared memory, or a switch). Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various example embodiments, the reception module 210 is configured to receive haptic data from a client device. The haptic data, in various example embodiments, indicates an interaction with a sensor included in the client device. In some cases, the haptic data includes at least one of a location component, a force component, a temporal component, or a motion component to indicate characteristics of the interaction with the sensor (e.g., touchscreen) included in the client device.

In some instances, the location component includes data to indicate an area on the touchscreen of the client device. In further instances, the location corresponds to a geographical location (e.g., location coordinates) of the client device when a user performs the interaction with the sensor included in the client device. In some instances, the geographical location includes altitude or a position of the client device when the user performs the interaction with the sensor. In some instances, the geographical location is determined using a Global Positioning System (e.g., GPS) receiver that is also included in the client device.

In some instances, the force component includes data to indicate an amount of force of the interaction with the sensor (e.g., an amount of strength applied to a surface of the sensor during the interaction with the sensor). The amount of strength applied to a surface of the sensor may also change during the interaction with the sensor. For example, the user may apply a larger amount of strength at the beginning of the interaction and then decrease the amount of strength as the interaction proceeds.

In some instances, the motion component includes data to indicate a motion of the interaction with the sensor. For instance, the user may perform one or more gestures (e.g., a swipe, a wiggle, a pinch, and the like) over a surface of the sensor and the gestures are captured and stored as data in the motion component.

In various example embodiments, the temporal component includes data that indicates the duration of the user interaction with the sensor. In various example embodiments, the haptic data is stored in one or more databases (e.g., database 126) upon receipt by the reception module 210.

In various example embodiments, the reception module 210 is further configured to receive, in addition to the haptic data, further information from the client device. For example, the reception module 210 is configured to receive audio data from the client device. The reception module 210 is also configured to receive image data or video data from the client device. The reception module 210 is also configured to receive descriptive data from the client device. Further, the reception module 210 is configured to receive an address of a recipient (e.g., an email address, a user identifier, and the like) from the client device.

In various example embodiments, the determination module 220 is configured to determine haptic characteristics based on the haptic data. In determining the haptic characteristics, the determination module 220 identifies data from each of the components of the haptic data (e.g., location, force, motion, or temporal). In further example embodiments, the determination module 220 is configured to analyze relationships among each of the identified haptic characteristics. For instance, the determination module 220 is configured to identify any suitable combinations of the identified haptic characteristics. Examples include determining a duration associated with an amount of force. Examples further include determining a duration of a gesture (e.g., swipe, wiggle, pinch, and the like). Examples may also include how much force is exerted during a specific gesture (e.g., swipe, wiggle, pinch, and the like). Examples also include determining a number of gestures being performed.

In further example embodiments, the determination module 220 is configured to determine whether the identified haptic characteristics match a certain predetermined threshold characteristic. Performing this determination may include determining that at least one of the components (e.g., location, force, or motion) includes data that matches the certain predetermined threshold characteristic. Performing this determination may also include determining that a combination of the identified haptic characteristics matches a combination of predetermined threshold characteristics.

In various example embodiments, the generation module 230 generates at least one image that depicts the haptic characteristics determined by the determination module 220.

As a result, the generated at least one image corresponds to the determined haptic characteristics. In further example embodiments, the generation module 230 generates a graph that corresponds to the haptic characteristics. The graph, in some instances, indicates a length that corresponds to a duration of the interaction. The graph, in some instances, further includes an amplitude that corresponds to an amount of force exerted during the interaction. In further instances, a color of the graph will correspond to the haptic characteristics. Moreover, a location of the graph will also correspond to the haptic characteristics.

In further example embodiments, the generation module 230 generates a haptic response. For example, the generation module 230 generates data that will cause the client device to shake. The haptic response, in some instances, is generated by the generation module 230 based on the haptic data. Depending on the haptic data, the generation module 230 generates data that causes the client device to shake for a certain length of time, which may be determined by the determination module 220. In other words, the determination module 220 uses the haptic data to also determine a certain length of time for the haptic response. The length of time for the haptic response, in some instances, depends on characteristics of the haptic data, as further explained below.

In further example embodiments, the generation module 230 generates the haptic response based on the further information or further data received, by the reception module 210, from the client device. As stated earlier, the further information or further data may be a video clip or an audio clip that is received or transmitted from the client device. In additional embodiments, the determination module 220 uses the further data to determine a certain length of time for the haptic response.

In various example embodiments, the display module 240 causes display of the at least one image on the client device. In doing so, the display module 240 transmits data which causes the at least one image to be displayed on the client device. The display module 240 is further configured to cause display of the graph that corresponds to the haptic characteristics. The display module 240 is also configured to cause display of the at least one image over a portion of a user interface of the client device.

Figure 3:
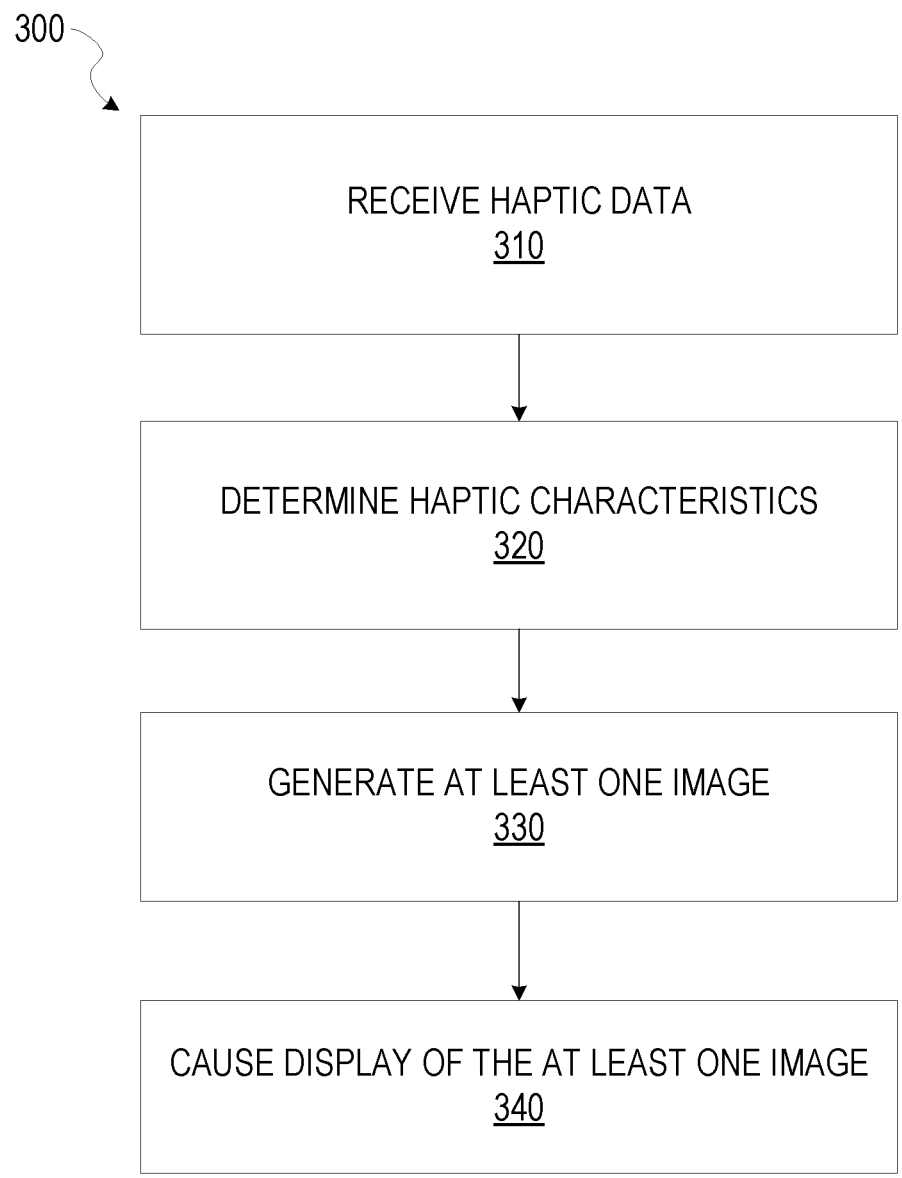
FIG. 3-7 are flowcharts illustrating operations of the haptic system in performing a method of causing display of an image that depicts haptic characteristics, according to some example embodiments.
Figure 4:
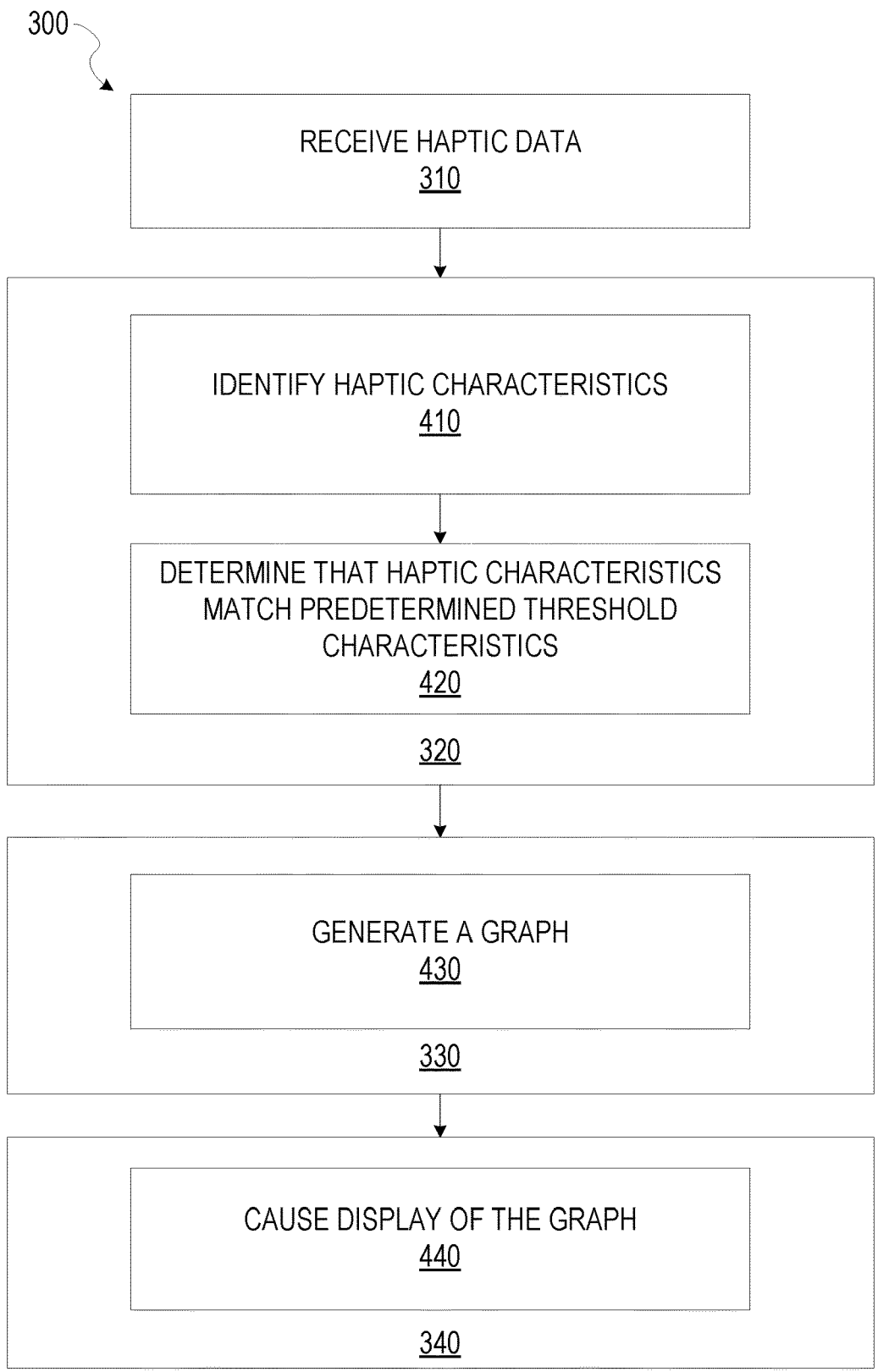

FIG. 3-7 are flowcharts illustrating operations of the haptic system 150 in performing a method 300 of causing display of an image that depicts haptic characteristics, according to some example embodiments. Operations in the method 300 may be performed in part or in whole by components of the haptic system 150, which can be embodied either in whole or in part in one or more application servers 140 of a networked system 102 using components described above with respect to FIG. 2. Accordingly, the method 300 is described by way of example with reference to the haptic system 150. However, it shall be appreciated that at least some of the operations of the method 300 may be deployed on various other hardware configurations or be performed by similar components residing elsewhere in the network architecture 100. Therefore, the method 300 is not intended to be limited to the haptic system 150. As shown in FIG. 3, the method 300 includes operations 310, 320, 330, and 340.

At operation 310, the reception module 210 receives haptic data from a client device. The haptic data, in various example embodiments, indicates an interaction with a sensor included in the client device. Example of the sensor include a touch screen on a smart phone or mobile device. Examples of the interactions include any gestures performed on a surface of the sensor included in the client device. In some instances, the sensor included in the client device is configured to detect a duration, a location, and an amount of force associated with the interaction. Accordingly, the haptic data will include these characteristics. Moreover, the haptic data may be organized into one or more components (e.g., force, temporal, motion).

As stated above, the haptic data includes at least one of a location component, a force component, a temporal component, or a motion component to indicate characteristics of the interaction with the sensor (e.g., touchscreen) included in the client device.

At operation 320, the determination module 220 determines haptic characteristics of the haptic data. For instance, the determination module 220 determines how much force is applied by the user on a surface of the sensor. As another example, the determination module 220 determines a gesture that is being performed by the user on the surface of the sensor. As another example, the determination module 220 determines a duration for which the gesture is being performed by the user on the surface of the sensor. As further explained below, this may include the determination module 220 identifying data from each of the components of the haptic data (e.g., location, force, motion, or temporal).

At operation 330, the generation module 230 generates at least one image that depicts the haptic characteristics. In other words, the generation module generates an image that depicts the data from each of the components of the haptic data. For example, the image may include a color that corresponds to the one of the components of the haptic data (e.g., location, force, motion, or temporal). As another example, the image may include a shape that corresponds to one of the components of the haptic data (e.g., location, force, motion, or temporal).

Further, the shape or color may be generated using a rule or process that maps the haptic data to the image. An example rule or process may include increasing an intensity of a color of the image based on the amount of force. Another example process may include increasing a size of a shape depicted in the image based on the duration of the interaction.

At operation 340, the display module 240 causes display of the generated at least one image on a client device. As further explained below, the display module 240 causes display of the generated at least one image over a portion of a user interface of the client device. In some instances, the user interface includes an existing image and the generated at least one image is displayed over a portion of the existing image. In further instances, the user interface includes the existing image and the generated at least one image is displayed proximate to the existing image. In some instances, the user interface further includes messages that are displayed to a user of the client device. Moreover, the generated at least one image is displayed next to the message that is displayed or over the message that is displayed.

As shown in FIG. 3, the method 300 may include one or more of operations 410, 420, 430, and 440. The operations 410 and 420 may be included in (e.g., in combination with or as a sub-routine of) the operation 320. The operation 430 may be performed as part of the operation 330. The operation 440 may be performed as part of the operation 340.

At operation 410, the determination module 220 identifies haptic characteristics. In performing this operation, the determination module 220 may determine or identify relationships among the haptic characteristics. In other words, the determination module 220 identifies and determines any suitable combinations of the identified haptic characteristics. Examples include determining a duration associated with an amount of force. Examples further include determining a duration of a gesture (e.g., swipe, wiggle, pinch, and the like). Examples may also include how much force is exerted for a specific gesture (e.g., swipe, wiggle, pinch, and the like). Examples also include determining a number of gestures being performed during the interaction.

At operation 420, the determination module 220 determines that the haptic characteristics match predetermined threshold characteristics. In some cases, the determination module 220 is further configured to determine that a combination of the identified haptic characteristics match with a predetermined combination of threshold characteristics. For instance, the determination module 220 determines that both the gesture and the duration of interaction match with a predetermined threshold gesture and a predetermined threshold duration.

At operation 430, the generation module 230 generates a graph. In some cases the graph depicts each of the haptic characteristics of the haptic data. For example, the graph will have a length that corresponds to a duration of the interaction, the graph will have an amplitude that corresponds to an amount of force exerted, the graph will have a frequency that corresponds to a gesture performed by the user, or any suitable combination thereof.

The graph, in some instances, is generated as soon as the haptic characteristics are identified. Therefore, in some cases, the graph is being generated by the generation module 230 simultaneously with the user is interacting with the sensor. As a result, the graph is being dynamically generated. In further embodiments, the graph is generated based on the determination at the operation 420 that the haptic characteristics match predetermined threshold characteristics.

At operation 440, the display module 240 causes display of the graph. In some instances, the graph is displayed over a portion of the user interface. In various example embodiments, the graph is displayed on top of information that is currently being displayed in the user interface (e.g., messages, images, video, and the like). In various example embodiments, the graph is displayed proximate to the information (e.g., messages, images, video, and the like) that is currently being displayed in the user interface.

Figure 5:
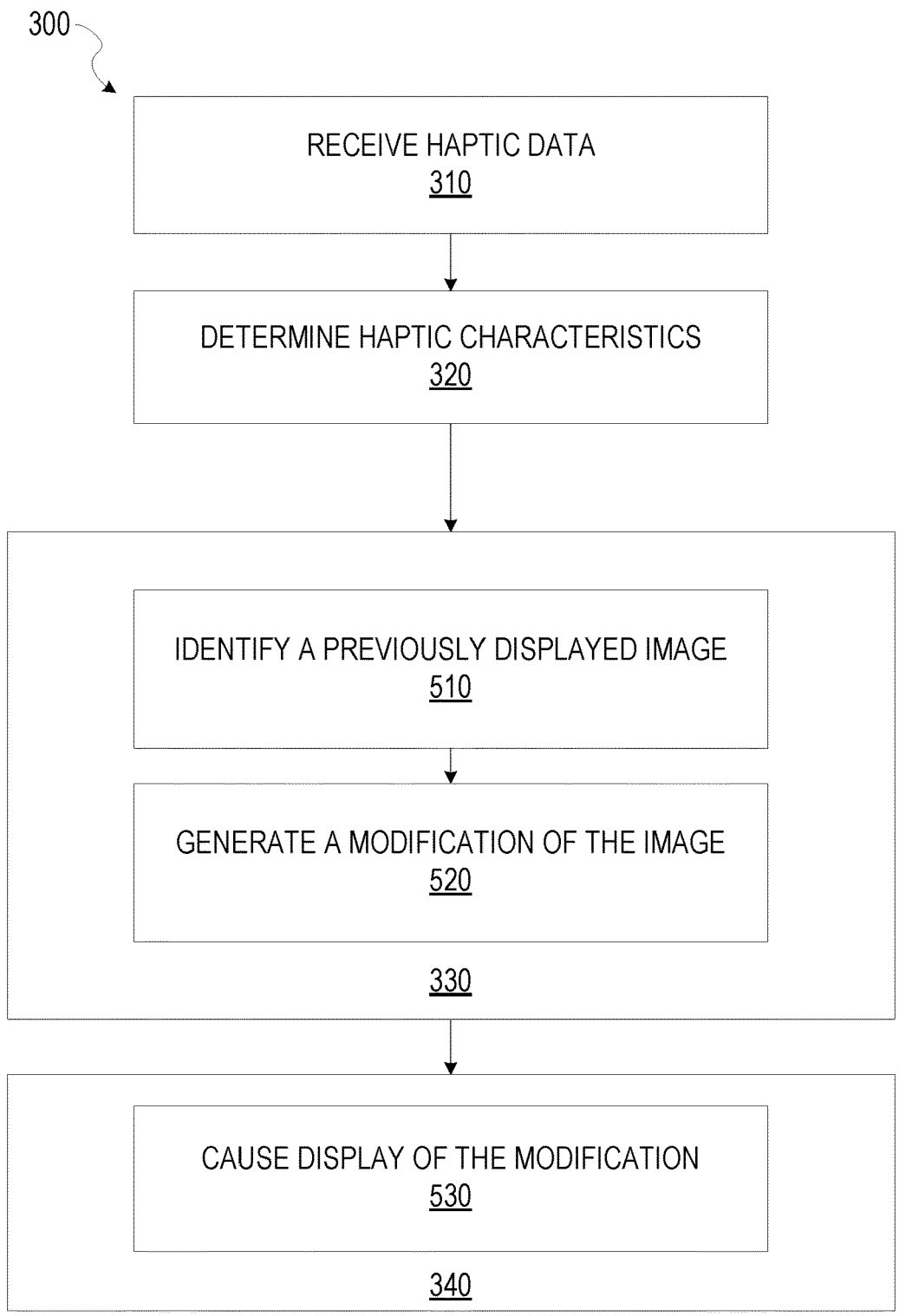

As shown in FIG. 5, the method 300 may include one or more of the operations 510, 520, and 530. The operations 510 and 520 may be a set of operations performed included in (e.g., in combination with or as a sub-routine of) the operation 330.

At operation 510, the determination module 220 identifies an image that is previously displayed in a user interface of the client device. The image may be displayed as part of a message displayed in the user interface of the client device. For example, the image may be embedded or attached to the message. The image may also be a captured by the client device with a camera attached to the client device. In further example embodiments, the determination module 220 identifies any other graphical element that is previously displayed in the user interface of the client device. The graphical elements may be elements that assist with navigation of the user interface of the client device.

At operation 520, the generation module 230 generates a modification of the image that is previously displayed in the user interface of the client device. Moreover, the modification of the image is based on the haptic characteristics determined at the operation 320. In some instances, modification of the image includes at least one of: changing a color of the image, changing dimensions of the image, distorting a portion of the image, and the like. The modification of the image may vary according to the haptic characteristics identified from the components of the haptic data (e.g., location, force, motion, or temporal). In further example embodiments, the generation module 230 generates a modification of the graphical element that is previously displayed in the user interface of the client device.

At operation 530, the display module 240 causes display of the modification of the image in the user interface of the client device. As a result, the image that was previously displayed in the user interface will still appear in the user interface, but in a modified form. In further example embodiments, the display module 240 causes display of the modification of the graphical element.

Figure 6:
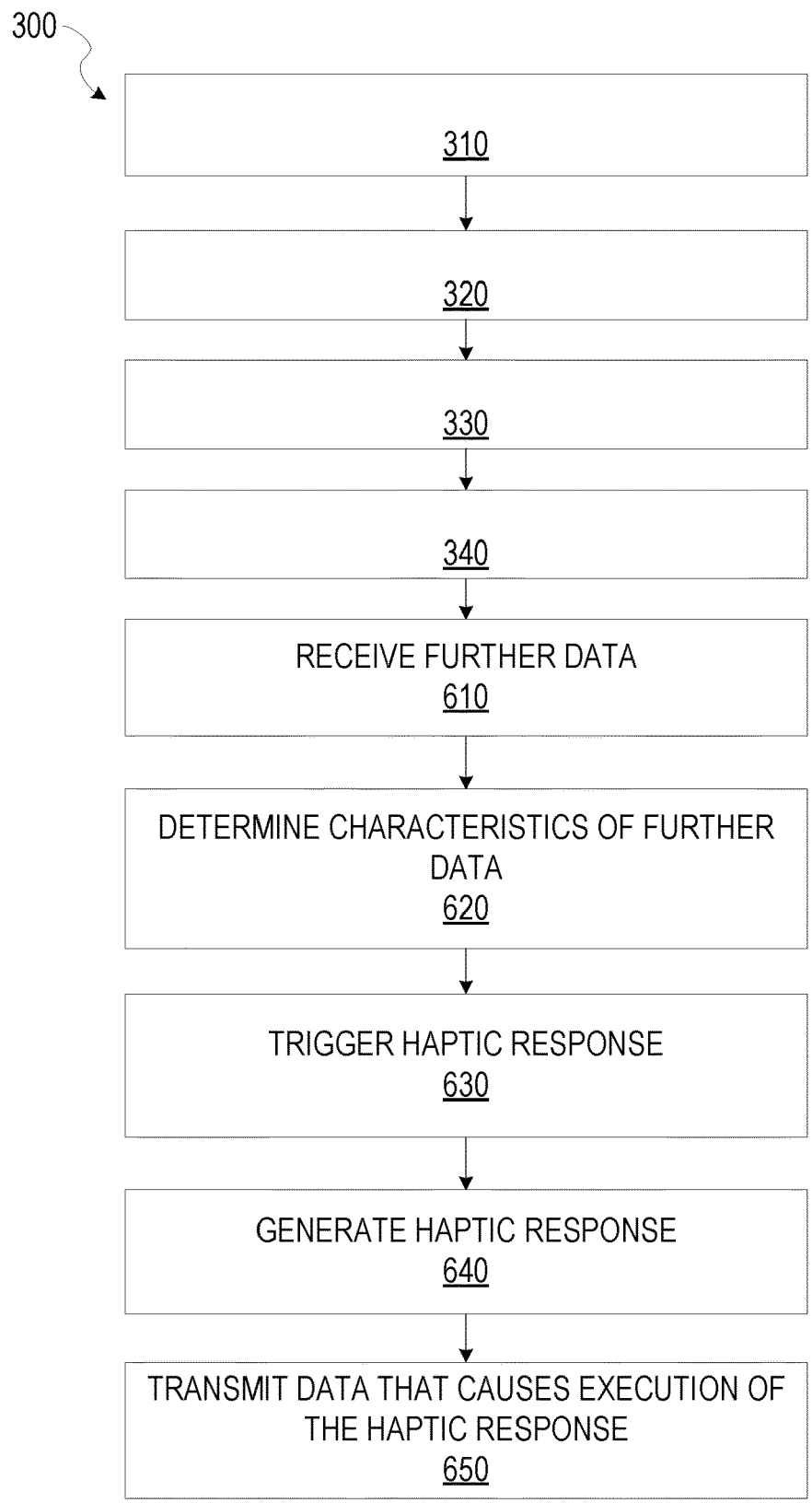

As shown in FIG. 6, the method 300 may include one or more of operations 610, 620, 630, 640, and 650. The operations 610, 620, 630, 640, and 650 may be a set of operations performed subsequent to the operation 340.

At operation 610, the reception module 210 receives further data. As stated above, the further data includes other forms of data other than the haptic data. For example, the further data includes images, video or audio. The user may upload an image file or a video file. The user may also upload an audio file. In some cases, the further data could also be messages that are being sent or received.

At operation 620, the determination module 220 determines characteristics of the further data. In some instances, the characteristics of the further data include sounds that are emitted during playback of the further data. Characteristics of the further data may also include colors, brightness, or a contrast of an image or a screenshot of a video included in the further data. Characteristics of the further data may also include characteristics (e.g., shapes, colors, and the like) of objects that are depicted within the further data.

At operation 630, the determination module 220 determines that the characteristics of the further data triggers a haptic response. In some cases, the determination module 220 determines that the characteristics of the further data meet certain threshold criteria which is used determine whether the haptic response is triggered. Examples of the threshold criteria include color criteria, brightness criteria, or contrast criteria. Other examples of threshold criteria include audio characteristics of the sounds that are emitted during playback of the further data, or examples of shapes that are depicted within the further data.

At operation 640, the generation module 230 generates a haptic response based on the further data. The haptic response, in some cases, may include a vibration or a shake executed by a motor that is embedded within the client device. Generating the haptic response includes generating data that causes the client device to execute the haptic response. For example, the data may include instructions that cause the client device to execute a motor that is embedded within the client device.

In various example embodiments, the duration of the haptic response corresponds to the characteristics of the further data (e.g., audio characteristics, color characteristics, and the like). Moreover, the duration of the haptic response may also correspond to a duration of the further data.

At operation 650, the display module 240 transmits data that causes execution of the haptic response. The display module 240 may transmit the data to the client device such that the client device becomes configured to execute the haptic response.

Figure 7:
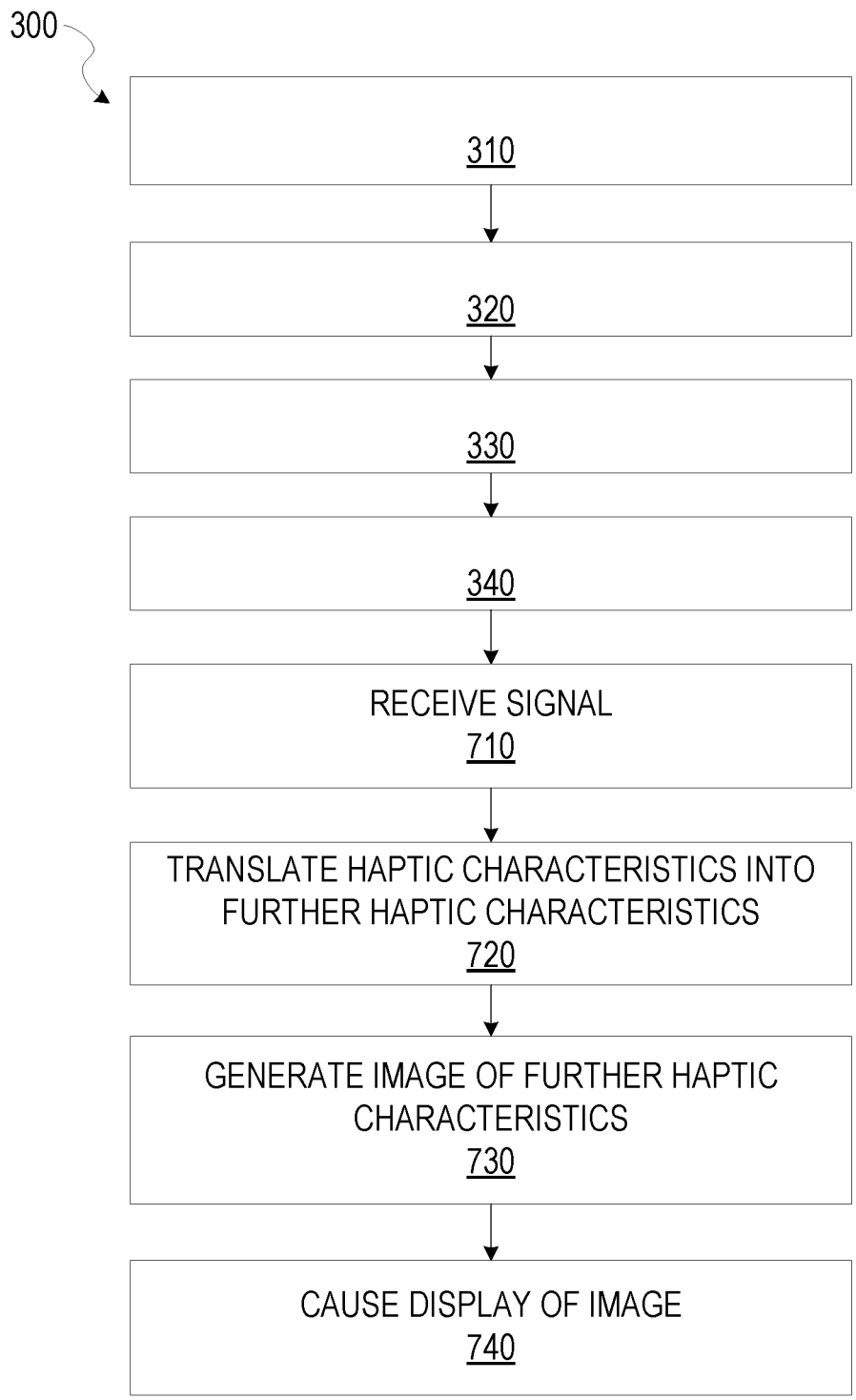

As shown in FIG. 7, the method 300 may include one or more of operations 710, 720, 730, and 740. The operations 710, 720, 730, and 740 may be a set of operations performed subsequent to the operation 340.

At operation 710, the reception module 220 receives a signal from a further client device. The signal may include information that indicates capabilities of the further client devices.

At operation 720, the determination module 220 translates the haptic characteristics into further haptic characteristics. In further example embodiments, the haptic characteristics are translated based on capabilities of one or more further client devices. The capabilities of the further device include a size of a screen of the further client device, hardware capabilities of the further client device, performance speeds of the further client device, dimensions of the further client device, storage capacities of the further client device, and the like. If the further client device includes processor or circuitry that result in faster processing speeds than the client device, then translation of the haptic characteristics may include enhancing the haptic characteristics with additional data for a more, in depth experience. If the further client device includes processor or circuitry that result in slower processing speeds than the client device, then translation of the haptic characteristics may include removing some data from the haptic characteristics in order to prevent a slower experience on the further client device.

In some instances, the further client device may have faster or slower downloading speeds as compared to the client device. As a result, the haptic characteristics may be adjusted to account for varying download speeds across each of the client device and the further client devices. In some instances, if the further client device has a screen size that is different from a screen size of the client device, then the haptic characteristics are modified to accommodate the difference in screen size.

At operation 730, the generation module 230 is configured to generate an image that depicts the further haptic characteristics. Similar to the operation 430 of FIG. 4, the image may be a graph that depicts the further haptic characteristics. Also similar to the operation 520 of FIG. 5, the image may be a modification of a previously displayed image. Moreover, at operation 740, the display module 240 is configured to cause display of the image that depicts the further haptic characteristics on the further client device.

Figure 8:
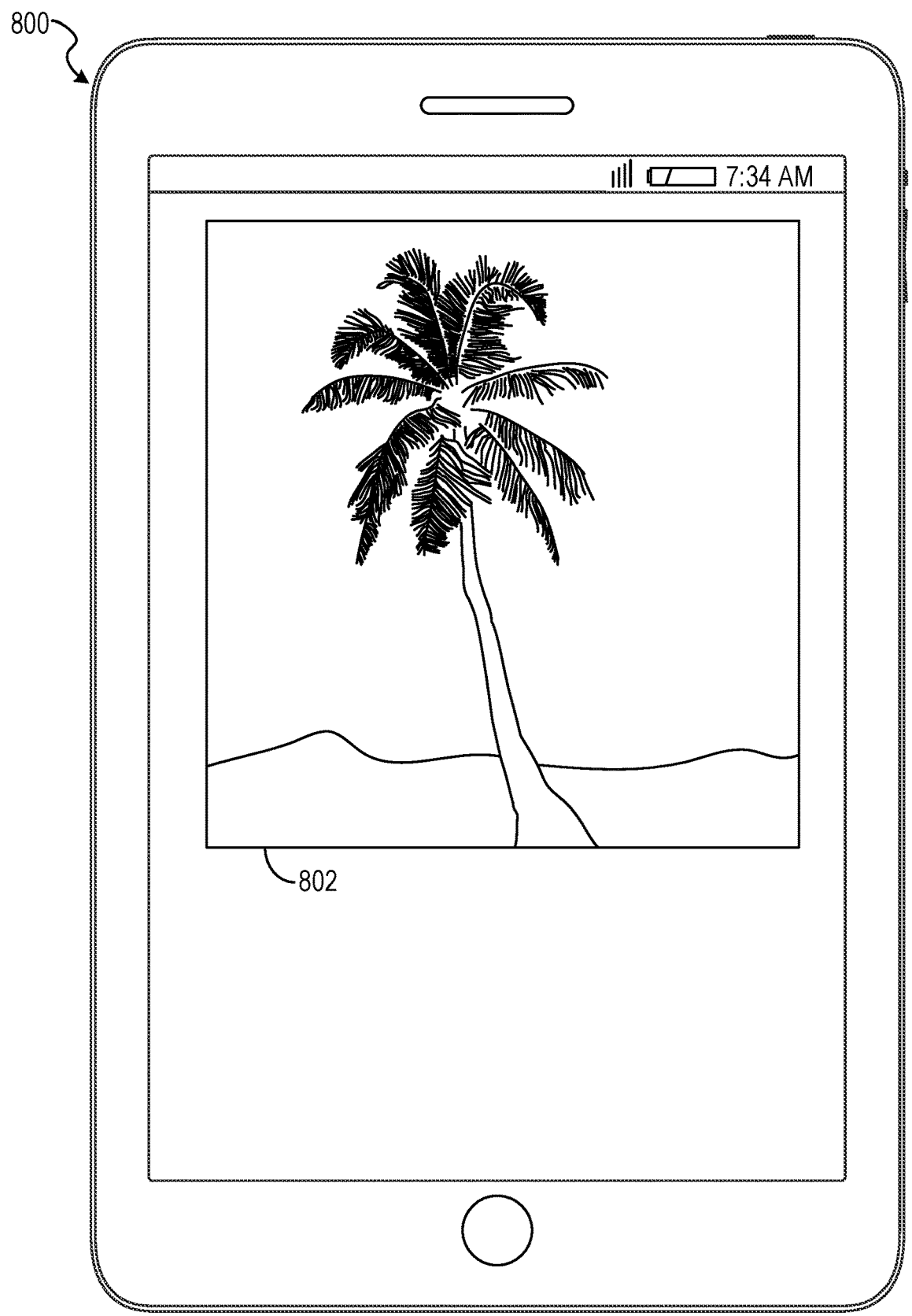
FIG. 8 is a block diagram illustrating an example user interface of a client device, according to some example embodiments.

FIG. 8 is a block diagram illustrating an example user interface 800 of a client device, according to some example embodiments. As shown in FIG. 8, the user interface 800 includes an image 802. In some instances, the image 802 may be generated by the client device (e.g., client device 110). For example, a camera included in the client device may be used to capture the image 802. In some instances, the image 802 is received from another client device as part of a message. The user may interact with the image 802 depicted in the user interface 800. Also, interaction with the image 802 will be recorded as haptic data.

Figure 9:
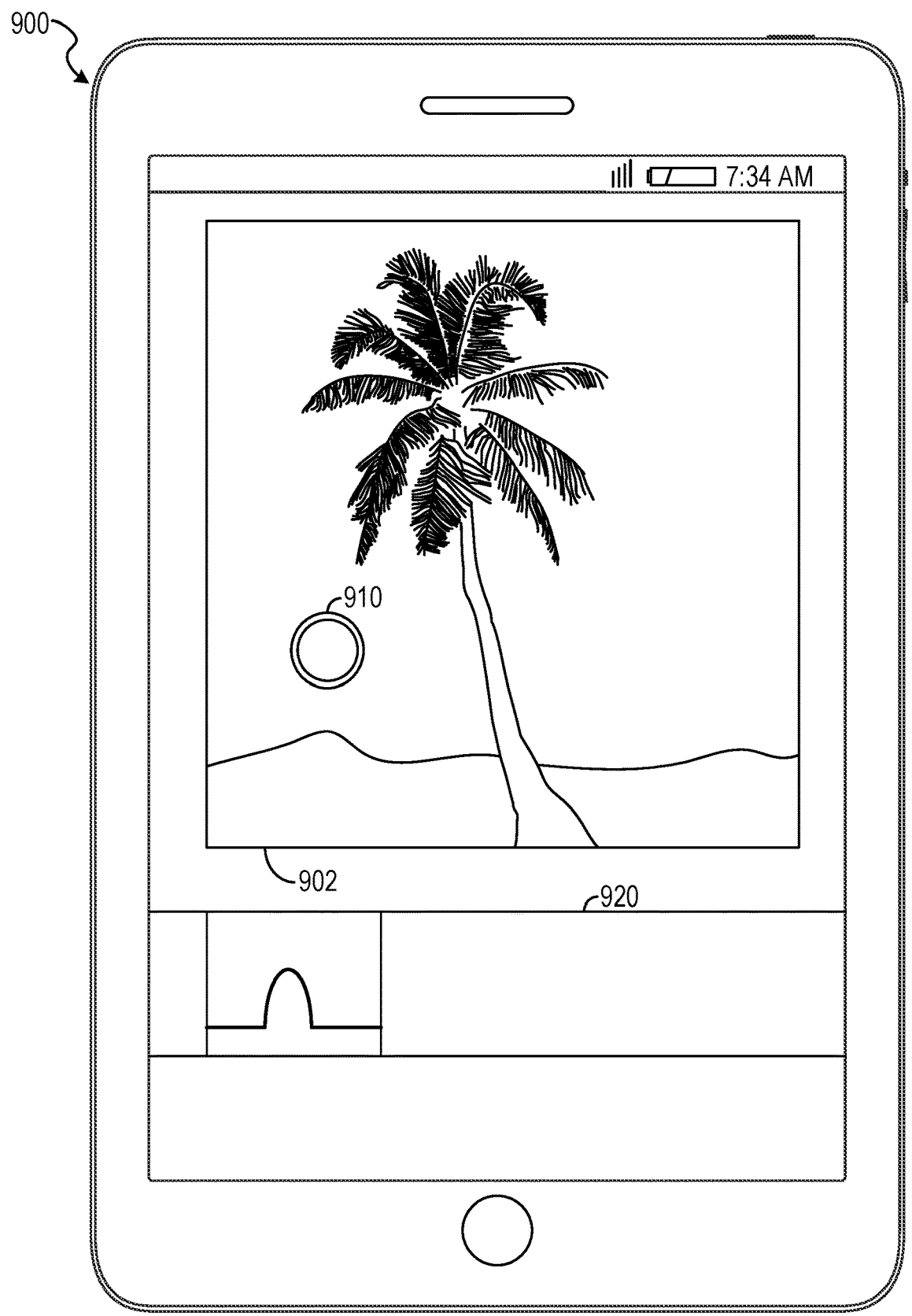
FIG. 9-10 are block diagrams illustrating example user interfaces including images that depict haptic characteristics, according to some example embodiments.

FIG. 9 is a block diagram illustrating an example user interface 900 including images that depict haptic characteristics, according to some example embodiments. As shown in FIG. 9, the user interface 900 includes an image 902, a graphical element 910, and a graph 920. The image 902 may correspond to the image 802 of FIG. 8. Moreover, the user interface 900 may be displayed on the same client device which displayed the user interface 700. The graphical element 910 represents or depicts characteristics of haptic data relating to interaction with the image 902. The graph 920 also depicts characteristics of the haptic data relating to the interaction with the image 902. In various example embodiments, the graphical element 910 and the graph 920 may be generated by the haptic system 150. Moreover, the haptic system 150 may generate the graphical element 910 and the graph 920 based at least in part on the haptic data. In some instances, the graph 920 is depicted with a length that corresponds to a duration of an interaction (e.g., interaction by a user with a touch screen) and an amplitude that corresponds to an amount of force supplied during the interaction. In some instances, the graphical element 910 depicts a location where the interaction by the user occurs with the touch screen.

Figure 10:
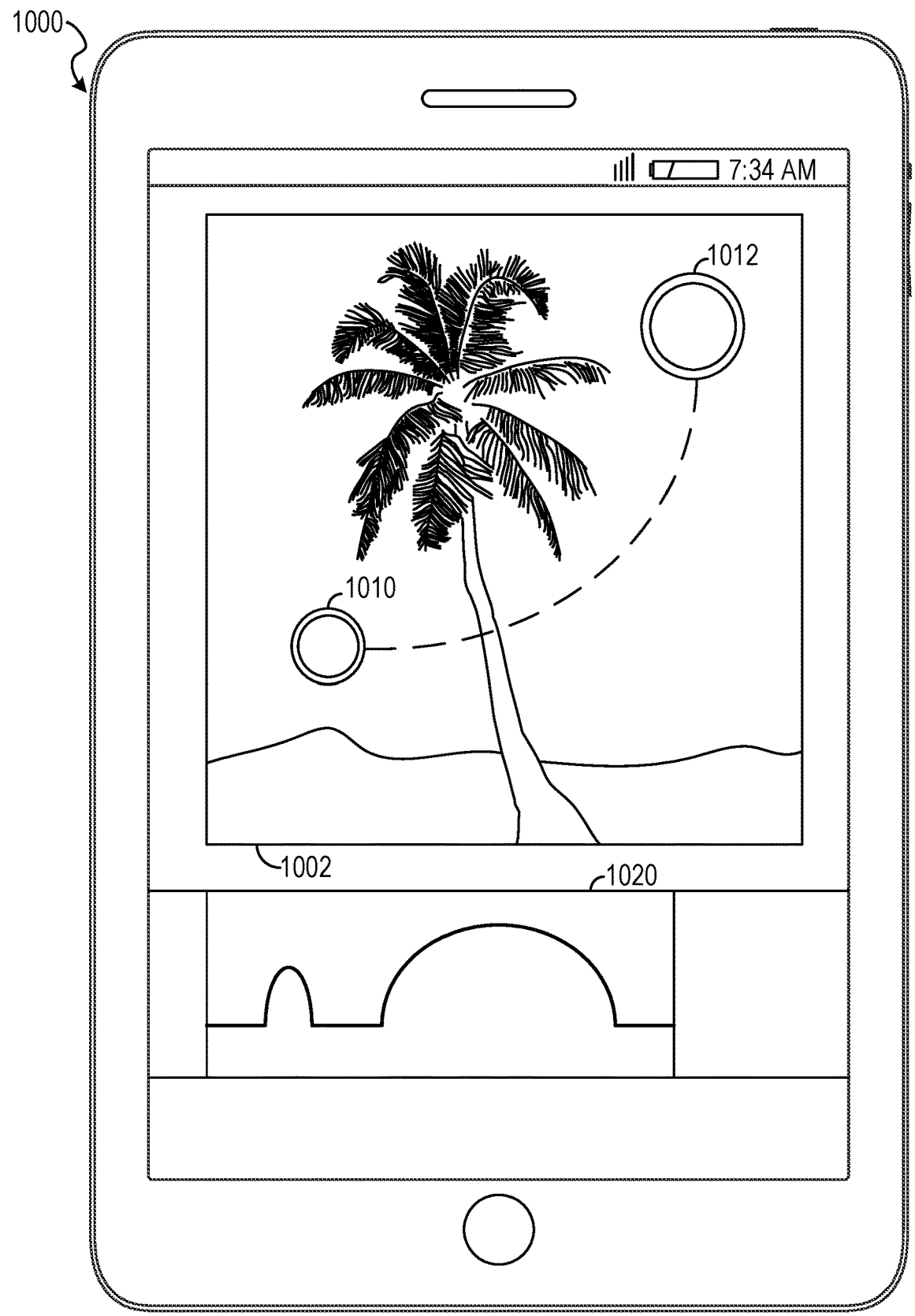

FIG. 10 is a block diagram illustrating an example user interface 1000 including images that depict haptic characteristics, according to some example embodiments. As shown in FIG. 10, the user interface 1000 includes an image 1002, a first graphical element 1010, a second graphical element 1012, and a graph 1020. As shown in FIG. 10, the first graphical element 1010 and the second graphical element 1012 are also depicted as being connected by a line. The line, in some instances, corresponds to a motion of an interaction made by a user with a touch screen of the client device. Further a size of the first graphical element 1010 and a size of the second graphical element 1012 may correspond to an amount of force supplied in the interaction at different moments during the interaction. Moreover, the locations of the first graphical element 1010 and the second graphical element 1020 correspond to separate locations of the interaction at separate moments during the interaction.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 11:
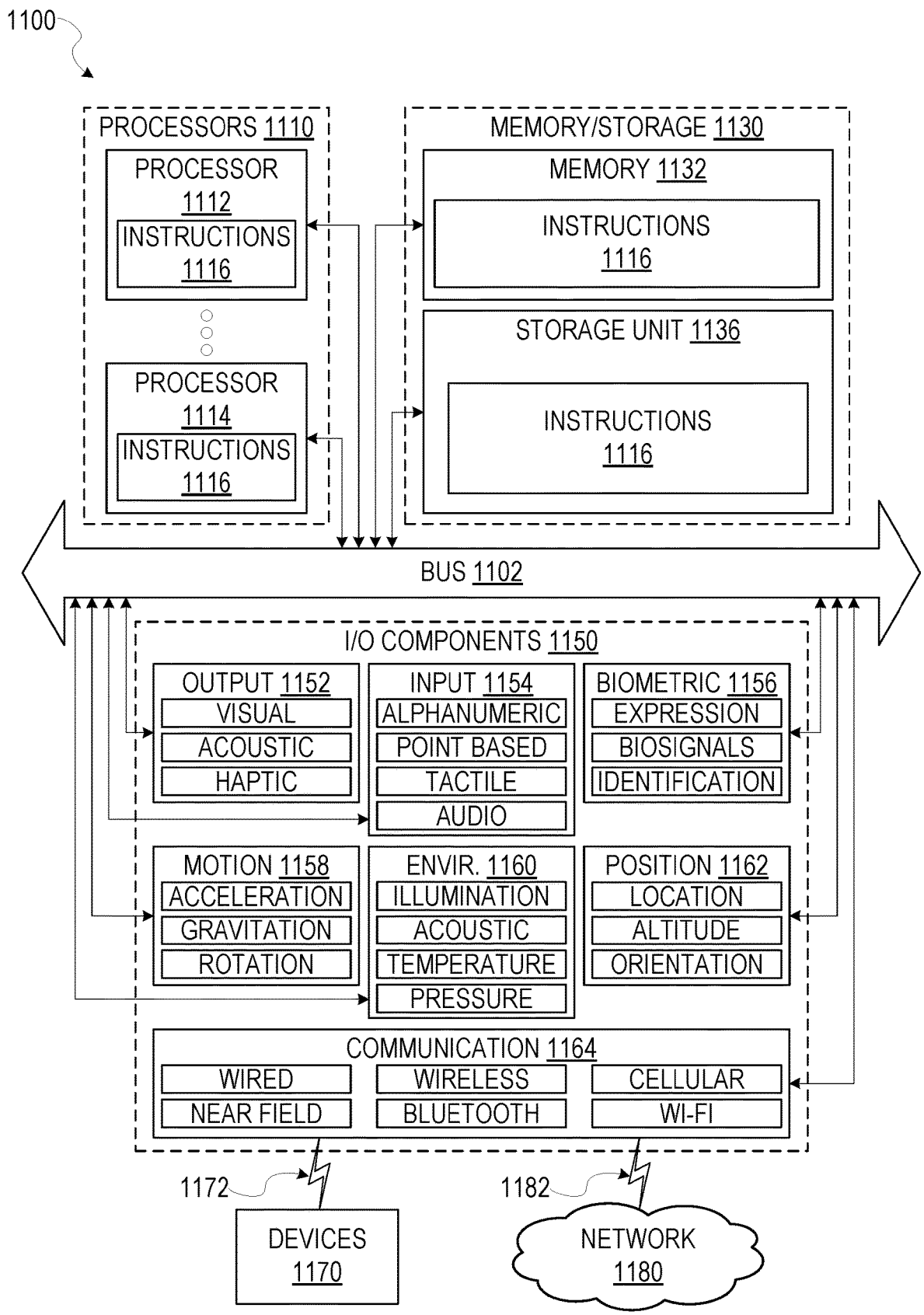
FIG. 11 illustrates a diagrammatic representation of a machine in the form of a computer system within which a set of instructions may be executed for causing the machine to perform any one or more of the methodologies discussed herein, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions may cause the machine to execute the flow diagrams of FIGS. 3-7. Additionally, or alternatively, the instructions may implement each of the modules described in of FIG. 2, and so forth. The instructions transform the general, non-programmed machine into a particular machine specially configured to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a smart phone, a mobile device, a wearable device (e.g., a smart watch), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1112 and processor 1114 that may execute instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core process), multiple processors with a single core, multiple processors with multiples cores, or any combination thereof.

The memory/storage 1130 may include a memory 1132, such as a main memory, or other memory storage, and a storage unit 1136, both accessible to the processors 110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   capturing a first image by a camera of a client device;
   receiving haptic data from the client device after capturing the first image, the haptic data indicating an interaction with a sensor included in the client device;
   determining, based on the haptic data, a plurality of haptic interactions performed over a given time interval;
   after capturing the first image by the camera of the client device, modifying a portion of the first image based on the plurality of haptic interactions; and
   causing concurrent display of both the first image which has been captured by the camera of the client device and modified based on the plurality of haptic interactions and a visual representation of a history of haptic interactions, the visual representation of the history of haptic interactions including the plurality of haptic interactions performed over the given time interval, a first portion of the visual representation comprising a first visual indication of a first of the plurality of haptic interactions made during a first portion of the given time interval and a second portion of the visual representation comprising a second visual indication of a second of the plurality of haptic interactions made during a second portion of the given time interval following the first portion of the given time interval, the first visual indication having a shape with a size that is determined based on a duration of time corresponding to the first of the plurality of haptic interactions.

2. The method of claim 1, wherein the plurality of haptic interactions are performed with respect to the first image displayed on a first portion of a touchscreen of the client device and result in one or more modifications of the first image, further comprising:
determining first and second haptic characteristics based on the haptic data;
determining that a combination of the first and second haptic characteristics match a predetermined combination of threshold characteristics; and
in response to determining that the combination of the first and second haptic characteristics match the predetermined combination of threshold characteristics, generating a second image that depicts the determined combination of the first and second haptic characteristics, the second image comprising the visual representation of the history of haptic interactions.

3. The method of claim 2, further comprising determining a location for the second image based on the history of haptic interactions, wherein the first visual indication comprises a first color corresponding to the first of the plurality of haptic interactions, and wherein the second visual indication comprises a second color corresponding to the second of the plurality of haptic interactions, the second color being of a greater intensity than the first color.

4. The method of claim 1, further comprising:
causing display of a graph over a portion of the first image, wherein the visual representation includes a graph that corresponds to the plurality of haptic interactions, the graph indicating a length that corresponds to a duration of each of the plurality of interactions, the graph indicating an amplitude that corresponds to an amount of force of each of the plurality of interactions.

5. The method of claim 1, further comprising:
receiving audio or video data;
determining characteristics of the audio or video data being played back;
determining that the characteristics of the audio or video data being played back trigger a haptic response; and
executing the haptic response during playback of the audio or video data that includes the determined plurality of haptic interactions.

6. The method of claim 1, further comprising setting a color for the first visual indication based on a first type of haptic data included in a first of the plurality of haptic interactions and setting the shape for the first visual indication based on a second type of haptic data included in the first of the plurality of haptic interactions, and wherein an intensity of the color is determined based on an amount of force corresponding to the first of the plurality of haptic interactions.

7. The method of claim 1, further comprising:
determining that a second client device has a different download speed than a first client device, wherein the client device is the first client device;
adjusting the plurality of haptic interactions based on a difference in download speed of the first client device relative to the second client device; and
triggering a response on the second client device based on the adjusted plurality of haptic interactions.

8. The method of claim 1, further comprising:
modifying a graphical element that assists with navigation of a user interface of the client device based on the plurality of haptic interactions.

9. The method of claim 1, further comprising:
determining capabilities of a second client device;
translating the plurality of haptic interactions into further haptic characteristics based on the capabilities of the second client device, wherein the client device is the first client device;
generating an image that depicts the further haptic characteristics; and
causing display of the image that depicts the further haptic characteristics on the second client device.

10. The method of claim 9, wherein the determining the capabilities of the second client device includes receiving, from the second client device, a signal that indicates the capabilities of the second client device, and wherein the translating comprises removing data from the plurality of haptic interactions in response to determining that the second client device includes circuitry that results in slower processing speeds than the first client device.

11. A system comprising:
one or more processors; and
a memory storing executable instructions that, when executed by the one or more processors, cause the one or more processors to perform operations comprising:
capturing a first image by a camera of a client device;
receiving haptic data from the client device after capturing the first image, the haptic data indicating an interaction with a sensor included in the client device;
determining, based on the haptic data, a plurality of haptic interactions performed over a given time interval;
after capturing the first image by the camera of the client device, modifying a portion of the first image based on the plurality of haptic interactions; and
causing concurrent display of both the first image which has been captured by the camera of the client device and modified based on the plurality of haptic interactions and a visual representation of a history of haptic interactions, the visual representation of the history of haptic interactions including the plurality of haptic interactions performed over the given time interval, a first portion of the visual representation comprising a first visual indication of a first of the plurality of haptic interactions made during a first portion of the given time interval and a second portion of the visual representation comprising a second visual indication of a second of the plurality of haptic interactions made during a second portion of the given time interval following the first portion of the given time interval, the first visual indication having a shape with a size that is determined based on a duration of time corresponding to the first of the plurality of haptic interactions.

12. The system of claim 11, wherein the plurality of haptic interactions are performed with respect to the first image displayed on a first portion of a touchscreen of the client device and result in one or more modifications of the first image, and wherein the operations further comprise:
determining first and second haptic characteristics based on the haptic data;
determining that a combination of the first and second haptic characteristics match a predetermined combination of threshold characteristics; and
in response to determining that the combination of the first and second haptic characteristics match the predetermined combination of threshold characteristics, generating a second image that depicts the determined combination of the first and second haptic characteristics, the second image comprising the visual representation of the history of haptic interactions.

13. The system of claim 11, wherein the image modified based on the plurality of haptic interactions is displayed in a dedicated first portion of a screen and the visual representation of the history of haptic interactions including the first and second portions is displayed in a dedicated second portion of the screen.

14. The system of claim 11, wherein the operations further comprise:
   causing display of a graph over a portion of the first image, wherein the visual representation includes a graph that corresponds to the plurality of haptic interactions, the graph indicating a length that corresponds to a duration of each of the plurality of interactions, the graph indicating an amplitude that corresponds to an amount of force of each of the plurality of interactions.

15. The system of claim 11, wherein the operations further comprise:
   receiving audio or video data;
   determining characteristics of the audio or video data being played back;
   determining that the characteristics of the audio or video data being played back trigger a haptic response; and
   executing the haptic response during playback of the audio or video data that includes the determined plurality of haptic interactions.

16. The system of claim 11, wherein the operations further comprise:
   setting a color for the first visual indication based on a first type of haptic data included in a first of the plurality of haptic interactions and setting the shape for the first visual indication based on a second type of haptic data included in the first of the plurality of haptic interactions, wherein an intensity of the color is determined based on an amount of force corresponding to the first of the plurality of haptic interactions.

17. The system of claim 11, wherein the operations further comprise:
   determining that a second client device has a different download speed than a first client device, wherein the client device is the first client device;
   adjusting the plurality of haptic interactions based on a difference in download speed of the first client device relative to the second client device; and
   triggering a response on the second client device based on the adjusted plurality of haptic interactions.

18. The system of claim 11, wherein the operations further comprise:
   determining that a second client device has a different screen size than a first client device, wherein the client device is the first client device;
   adjusting the plurality of haptic interactions based on a difference in screen size of the first client device relative to the second client device; and
   triggering a response on the second client device based on the adjusted plurality of haptic interactions.

19. The system of claim 11, wherein the operations further comprise modifying a graphical element that assists with navigation of a user interface of the client device based on the plurality of haptic interactions, the visual representation comprising a frequency corresponding to the plurality of haptic interactions.

20. A non-transitory machine readable medium storing instructions that, when executed by one or more processors of a machine, cause the machine to perform operations comprising:
   capturing a first image by a camera of a client device;
   receiving haptic data from the client device after capturing the first image, the haptic data indicating an interaction with a sensor included in the client device;
   determining, based on the haptic data, a plurality of haptic interactions performed over a given time interval;
   after capturing the first image by the camera of the client device, modifying a portion of the first image based on the plurality of haptic interactions; and
   causing concurrent display of both the first image which has been captured by the camera of the client device and modified based on the plurality of haptic interactions and a visual representation of a history of haptic interactions, the visual representation of the history of haptic interactions including the plurality of haptic interactions performed over the given time interval, a first portion of the visual representation comprising a first visual indication of a first of the plurality of haptic interactions made during a first portion of the given time interval and a second portion of the visual representation comprising a second visual indication of a second of the plurality of haptic interactions made during a second portion of the given time interval following the first portion of the given time interval, the first visual indication having a shape with a size that is determined based on a duration of time corresponding to the first of the plurality of haptic interactions.

* * * * *